US010685007B2

(12) United States Patent
Eberlein et al.

(10) Patent No.: US 10,685,007 B2
(45) Date of Patent: Jun. 16, 2020

(54) TABLE CONTENT TRANSPORT AND DELIVERY

(71) Applicant: SAP SE, Walldorf (DE)

(72) Inventors: Peter Eberlein, Malsch (DE); Volker Driesen, Heidelberg (DE); Arne Harren, Walldorf (DE)

(73) Assignee: SAP SE, Walldorf (DE)

( * ) Notice: Subject to any disclaimer, the term of this patent is extended or adjusted under 35 U.S.C. 154(b) by 475 days.

(21) Appl. No.: 15/083,918

(22) Filed: Mar. 29, 2016

(65) Prior Publication Data

US 2017/0286467 A1 Oct. 5, 2017

(51) Int. Cl.
*G06F 16/00* (2019.01)
*G06F 16/22* (2019.01)
*G06F 16/21* (2019.01)
*G06F 16/28* (2019.01)

(52) U.S. Cl.
CPC ........ *G06F 16/2282* (2019.01); *G06F 16/211* (2019.01); *G06F 16/289* (2019.01)

(58) Field of Classification Search
CPC ......... G06F 17/30997; G06F 17/30864; G06F 17/30923; G06F 16/2282; G06F 16/211; G06F 16/289
USPC ...................................................... 707/792
See application file for complete search history.

(56) References Cited

U.S. PATENT DOCUMENTS

| | | | |
|---|---|---|---|
| 5,960,269 A | * | 9/1999 | Ristow .............. H01L 29/66462 257/194 |
| 7,523,142 B2 | | 4/2009 | Driesen et al. |
| 7,657,575 B2 | | 2/2010 | Eberlein et al. |
| 7,720,992 B2 | | 5/2010 | Brendle et al. |
| 7,734,648 B2 | | 6/2010 | Eberlein |
| 7,739,387 B2 | | 6/2010 | Eberlein et al. |
| 7,827,565 B2 | * | 11/2010 | Minium, Jr. ............ G06F 9/541 717/101 |
| 7,971,209 B2 | | 6/2011 | Eberlein et al. |
| 8,126,919 B2 | | 2/2012 | Eberlein |
| 8,200,634 B2 | | 6/2012 | Driesen et al. |
| 8,225,303 B2 | | 7/2012 | Wagner et al. |
| 8,250,135 B2 | | 8/2012 | Driesen et al. |
| 8,291,038 B2 | | 10/2012 | Driesen |
| 8,301,610 B2 | | 10/2012 | Driesen et al. |
| 8,356,010 B2 | | 1/2013 | Driesen |
| 8,375,130 B2 | | 2/2013 | Eberlein et al. |
| 8,380,667 B2 | | 2/2013 | Driesen |
| 8,392,573 B2 | | 3/2013 | Lehr et al. |
| 8,402,086 B2 | | 3/2013 | Driesen et al. |
| 8,407,297 B2 | | 3/2013 | Schmidt-Karaca et al. |
| 8,434,060 B2 | | 4/2013 | Driesen et al. |
| 8,467,817 B2 | | 6/2013 | Said et al. |

(Continued)

*Primary Examiner* — Jean M Corrielus
(74) *Attorney, Agent, or Firm* — Fish & Richardson P.C.

(57) ABSTRACT

A deployment infrastructure (DI) imports at least one object description artifact and at least one content data file associated with a database object to a design-time container. The DI deploys the database object in a runtime container based on the at least one object description artifact and the at least one content data file. The DI exports the at least one object description artifact in the design-time container and at least one updated content data file based on an updated database object in the runtime container, wherein the updated database object includes updated content of the database object generated at runtime of a database application.

17 Claims, 7 Drawing Sheets

(56) References Cited

U.S. PATENT DOCUMENTS

| | | |
|---|---|---|
| 8,479,187 B2 | 7/2013 | Driesen et al. |
| 8,510,710 B2 | 8/2013 | Harren et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,645,483 B2 | 2/2014 | Odenheimer et al. |
| 8,706,772 B2 | 4/2014 | Hartig et al. |
| 8,751,573 B2 | 6/2014 | Said et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,026,525 B2 | 5/2015 | Harren et al. |
| 9,026,857 B2 | 5/2015 | Becker et al. |
| 9,031,910 B2 | 5/2015 | Driesen |
| 9,032,406 B2 | 5/2015 | Eberlein |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,256,840 B2 | 2/2016 | Said et al. |
| 9,262,763 B2 | 2/2016 | Peter et al. |
| 9,274,757 B2 | 3/2016 | Said et al. |
| 9,286,399 B2 * | 3/2016 | Pingree ............ G06F 17/30997 |
| 9,454,592 B2 * | 9/2016 | Mills ................ G06F 17/30578 |
| 9,990,188 B2 * | 6/2018 | Khot ........................ G06F 8/51 |
| 10,049,337 B2 * | 8/2018 | Mack .................. G06Q 10/067 |
| 10,528,341 B2 * | 1/2020 | Bregler .................... G06F 8/71 |
| 2002/0049788 A1 * | 4/2002 | Lipkin ................. G06F 16/972 |
| | | 715/236 |
| 2003/0058277 A1 * | 3/2003 | Bowman-Amuah ...................... |
| | | G06F 16/289 |
| | | 715/765 |
| 2005/0203931 A1 * | 9/2005 | Pingree ............ G06F 17/30997 |
| 2005/0204367 A1 * | 9/2005 | Minium, Jr. ............ G06F 9/541 |
| | | 719/328 |
| 2010/0088350 A1 * | 4/2010 | Ahmed ..................... G06F 8/31 |
| | | 707/803 |
| 2014/0109037 A1 * | 4/2014 | Ouali ........................ G06F 8/10 |
| | | 717/105 |
| 2014/0279880 A1 * | 9/2014 | Mills ................ G06F 17/30578 |
| | | 707/613 |
| 2014/0331213 A1 * | 11/2014 | Ahmed ..................... G06F 8/31 |
| | | 717/140 |
| 2015/0213129 A1 * | 7/2015 | Pingree ............ G06F 17/30997 |
| | | 707/769 |
| 2016/0350091 A1 * | 12/2016 | Khot ........................ G06F 8/51 |
| 2016/0350303 A1 * | 12/2016 | Fischer ............ G06F 17/30958 |
| 2017/0060537 A1 * | 3/2017 | Mack ........................ G06F 8/20 |
| 2017/0061338 A1 * | 3/2017 | Mack .................. G06Q 10/067 |
| 2017/0061348 A1 * | 3/2017 | Mack ............... G06Q 10/06313 |
| 2017/0147311 A1 * | 5/2017 | Bregler .................... G06F 8/60 |
| 2017/0147333 A1 * | 5/2017 | Bregler .................... G06F 8/71 |
| 2017/0286100 A1 * | 10/2017 | Bregler ............... G06F 9/44521 |

* cited by examiner

```
# XBUT, 20
button.left = "Left Button"
# XBUT, 20
button.right = "Right Button"
```
402, 404

Properties file: widgets_default_en.properties

FIG. 4A — 400a

```
# XBUT, 20
button.left = "Linker Knopf"
# XBUT, 20
button.right = "Rechter Knopf"
```

Properties file: widgets_default_de.properties

FIG. 4B — 400b

```
# XBUT, 20
button.left = "Button on the left"
# XBUT, 20
button.right = "Button on the right"
```

Properties file: widgets_customer_en.properties

FIG. 4C — 400c

Text table: Widgets

| Key1 | Key2 | Namespace | Language | Text |
|---|---|---|---|---|
| button | left | 0 | en | Left Button |
| button | right | 0 | en | Right Button |
| button | left | 0 | de | Linker Knopf |
| button | right | 0 | de | Rechter Knopf |
| button | left | 1 | en | Button on the left |
| button | right | 1 | en | Button on the right |

```
"imports": [ {
    "source_data": {
        "file_name": "widgets_default_en.properties" },
    "constant_columns": {
        "Namespace": "0",
        "Language": "en" },
    "mappings": {
        "Key1": 1,
        "Key2": 2,
        "Text": 3 },
    "filter": [ {
        "Namespace": "0",
        "Language": "en" } ],
    "target_table": "Widgets" },
{
    "source_data": {
        "file_name": "widgets_default_de.properties" },
    "constant_columns": {
        "Namespace": "0",
        "Language": "de" },
    "mappings": {
        "Key1": 1,
        "Key2": 2,
        "Text": 3 },
    "filter": [ {
        "Namespace": "0",
        "Language": "de" } ],
    "target_table": "Widgets" } ]
```

Annotations: 602, 604, 606, 608, 612, 614, 616, 618

```
"imports": [ {
    "source_data": {
        "file_name": "widgets_customer_en.properties" },
    "constant_columns": {
        "Namespace": "1",
        "Language": "en" },
    "mappings": {
        "Key1": 1,
        "Key2": 2,
        "Text": 3 },
    "filter": [ {
        "Namespace": "1",
        "Language": "en" } ],
    "target_table": "Widgets" } ]
```

622 — source_data
624 — constant_columns
628 — target_table

TABLE CONTENT TRANSPORT AND DELIVERY

BACKGROUND

In database applications, use cases arise where table content needs to be transported and delivered from one system to another. For example, table content that has been customized, edited, or newly created at runtime on one system needs to be transported to another system. It is desired that same transport mechanism is used for delivering table content as well as metadata describing the table, for example, metadata describing the table structure and content. This enables a consistent deployment of database objects to ensure implicit dependencies so that a table is created before content can be inserted.

SUMMARY

The present disclosure describes methods and systems, including computer-implemented methods, computer program products, and computer systems for table content transport and delivery.

In an implementation, a deployment infrastructure (DI) imports at least one object description artifact and at least one content data file associated with a database object to a design-time container. The DI deploys the database object in a runtime container based on the at least one object description artifact and the at least one content data file. The DI exports the at least one object description artifact in the design-time container and at least one updated content data file based on an updated database object in the runtime container, wherein the updated database object includes updated content of the database object generated at runtime of a database application.

Particular implementations of described methods and systems can include corresponding computer systems, apparatuses, or computer programs (or a combination of computer systems, apparatuses, and computer program) recorded on one or more computer storage devices, each configured to perform the actions of the methods. A system of one or more computers can be configured to perform particular operations or actions by virtue of having software, firmware, hardware, or a combination of software, firmware, or hardware installed on the system that, in operation, causes the system to perform the actions. One or more computer programs can be configured to perform particular operations or actions by virtue of including instructions that, when executed by data processing apparatus, cause the apparatus to perform the actions.

The above-described implementation is implementable using a computer-implemented method; a non-transitory, computer-readable medium storing computer-readable instructions to perform the computer-implemented method; and a computer system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, the described subject matter uses the same transport mechanism for transporting table content and metadata describing the table. This enables a consistent deployment of database objects to ensure implicit dependencies, so that a table is created before content can be inserted. Second, the described subject matter enables efficient transport of runtime-authored content by fetching updated content from a runtime container when exporting a table. Third, the described subject matter enables storage of table content and metadata describing the table in the same and possibly external repository. Fourth, the described subject matter enables use of a runtime application user interface to create table content at design time. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 4A illustrates a properties file of a translatable text table for default configuration and English language, according to an implementation.

FIG. 4B illustrates a properties file of a translatable text table for default configuration and German language, according to an implementation.

FIG. 4C illustrates a properties file of a translatable text table for customer configuration and English language, according to an implementation.

FIG. 6A illustrates a table description artifact for default configuration, according to an implementation.

FIG. 6B illustrates a table description artifact for customer configuration, according to an implementation.

Like reference numbers and designations in the various drawings indicate like elements.

DETAILED DESCRIPTION

Figure 1:
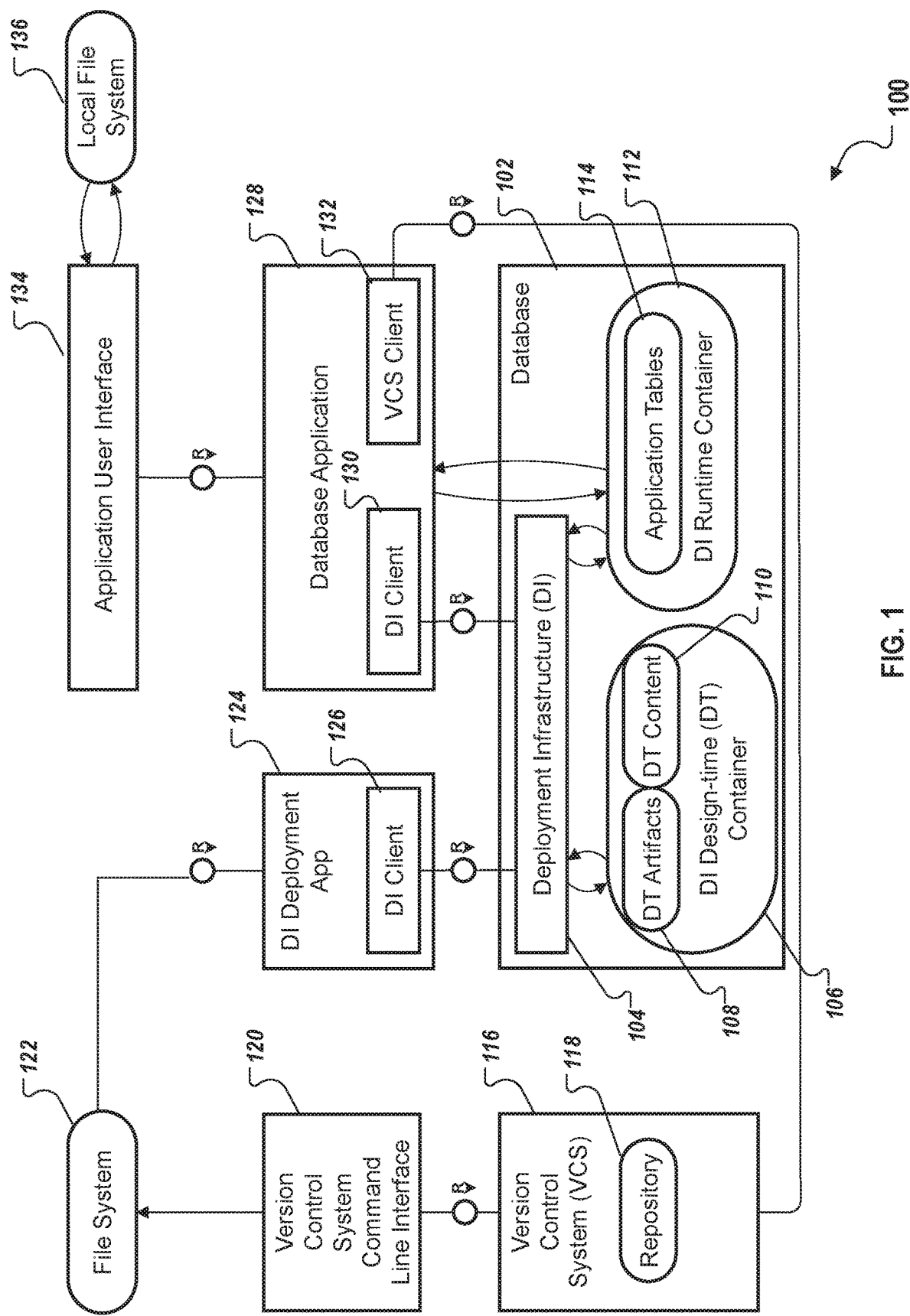
FIG. 1 is a block diagram illustrating an example table content transport and delivery system, according to an implementation, according to an implementation.

The following detailed description describes table content transport and delivery and is presented to enable any person skilled in the art to make and use the disclosed subject matter in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described or illustrated implementations, but is to be accorded the widest scope consistent with the principles and features disclosed herein.

In database applications, use cases arise where table content needs to be transported and delivered from one system to another system. For example, after an application has been developed on a test system, data of the application (such as configuration data) can be stored in a table and transported to a production system along with the application code so that the production system can validate whether the newly developed application works with other system components. In another example, after the application has been validated in the production system, the application is delivered to a customer, with default configuration data stored in a table. The customer may customize or edit the default configuration data. The customized configuration data can be either stored in a separate table or appended to the default configuration data in a same table and transported back to the test system or production system at the application provider for verification.

The described approach transports a table based on a table description artifact describing the table structure and content and data files comprising actual table content. The table description artifact can include metadata describing how to import the actual table content into the table. In some implementations, the table structure and the metadata describing how to import the actual table content are stored in separate artifacts. Separating the actual table content from the table description enables flexible table deployment. For example, to deploy or form a new table which combines multiple existing tables, a table description artifact can be defined that references data files associated with the existing tables and includes metadata defining the new table structure and specifying how to import the data files into the new table. Similarly, if a subset of content from an existing table is to be exported to a new table, a table description artifact can be defined that references data files associated with the existing table and specifies the content to be exported, for example, by specifying key ranges of the content to be exported. In some cases, multiple table description artifacts can be combined to deploy one target table by having each table description artifact reference the same target table. In some implementation, to facilitate table transport a version control system (VCS) is used. When a table is transported from a first system to a second system, the first system can export table information (for example, table description artifacts and associated data files) to the VCS and the second system can import the same information from the VCS to deploy the table.

FIG. 1 is a block diagram illustrating an example table content transport and delivery system 100, according to an implementation. The example system 100 can include a database 102, a VCS 116 with a repository 118, a deployment infrastructure (DI) deployment app 124 that can import table information (such as table description artifacts and data files for actual table content) from the VCS 116 to the database 102, and a database application 128 that can export table information from the database 102 to the VCS 116. The database 102 typically includes a DI 104, a DI design-time container 106, and a DI runtime container 112. The design-time container 106 can include design-time (DT) artifacts 108 storing table description artifacts and a DT content 110 storing data files for the table content. The runtime container 112 can include application tables 114 storing deployed tables. The DI deployment app 124 can include a DI client 126 interacting with the DI 104 in database 102. Similarly, the database application 128 can also include a DI client 130 interacting with the DI 104 in database 102. The database application 128 can further include a VCS client 132 interacting with the VCS 116. The VCS 116 is typically relied on to keep both current and previous versions of table description artifacts and data files for table content. The VCS 116 can connect to a VCS command line interface (CLI) 120 and a file system 122. The database application 128 can connect to an application user interface (UI) 134 and a local file system 136. In a typical implementation, the database 102, the VCS 116, and the database application 128 are on server(s), on different servers or a same server, while the VCS CLI 120, the file system 122, the DI deployment app 124, the application UI 134, and the local file system 136 are on a client. As will be understood by those of ordinary skill in the art, the illustrated implementation is only one possible variation of a table content transport and delivery system 100 consistent with the teachings of this disclosure. Other variations are considered to be within the scope of this disclosure.

As discussed above, table content transport is based on table description artifacts and data files for actual table content. The table description artifact can be file-based and describes a table in its target state, as well as dependencies on other database objects, which enables the DI 104 to determine a valid order for deployment. For example, the table description artifact can include metadata specifying a table structure, data files for table content, and how to import the table content to the table structure. For example, if the table content is stored in multiple data files, the table description artifact can include file names of the data files, so that these data files can be identified when the table is deployed. The table description artifact can specify columns in the table and mapping of data from the data files to these columns. In some cases, the table description artifact can specify key ranges for the content to be transported. The table description artifact can also include a name of the target table. In some implementations, a target table can be described by multiple table description artifacts and each table description artifact includes the name of the target table so that, when deploying the table the, associated artifacts can be identified. The data files storing the actual table content can be comma-separated values (CSV) files or properties files. CSV files can be created using tools such as Excel. In some cases, the data files can be Unicode Transformation Format-8 (UTF-8) encoded. A binary file format such as a binary large object (BLOB) file can also be used for efficient file storage of data files.

The database 102 includes the DI 104 interacting with the DI design-time container 106 and the DI runtime container 112. The DI 104 is a service layer implemented at the top of the database 102 that can simplify table content transport by using a transactional all-or-nothing deployment model and manage implicit dependencies in a table deployment. The DI 104 can provide an interface to upload table description artifacts and data files for table content to the design-time container 106 from an external source such as the VCS 116. In a typical implementation, the uploaded table description artifacts can be stored in DT artifacts 108 of the design-time container 106 and the uploaded data files stored in a DT content 110. The design-time container 106 can maintain a complete picture of deployed tables to determine which tables have changed in a repeated deployment and also enable partial deployments of a subset of tables. Further, the DI 104 can read table description artifacts from the DT artifacts 108 and data files from the DT content 110 and deploy a table in the runtime container 112. For example, the DI 104 can insert data from the data files into a table, according to the metadata in the table description artifact. The deployed table can be stored in application tables 114 of the runtime container 112. In some implementations, the deployed table can be implemented as a database schema. During runtime of the database application 128, the content of the deployed table in the application tables 114 may be updated or created by the application 128. The DI 104 can create, re-create or alter new or structurally changed runtime tables, and replace table content for defined key ranges to produce a target table as described by the table description artifacts stored in the design-time container 106. When exporting the table information (for example, to VCS 116), the DI 104 can read the table description artifact from the DT artifacts 108 of the design-time container 106 and fetch the actual table content from the application tables 114 of the runtime container 112. The resulting export therefore contains updated table content, which may be different from the content that was originally imported because the application 128 may have updated the tables during runtime. While table description artifacts are typically imported or exported through the DI 104, table content can be directly accessed from the application tables 114 like any other data. This allows table content to be created using a regular application user interface 134 associated with the application 128, including running through application specific validations and consistency checks.

Two methods can be used to import table description artifacts and data files for table content into the design-time container 106 of the database 102. A first method is to through the DI deployment app 124 which can be pushed to a client as a separate package but in the same way as other artifacts, like application code or static UI content pushed to the client. The job of the DI deployment app 124 is to call the DI 104 to upload database artifacts (for example, table description artifacts and data files) pushed with the app to the design-time container 106 and trigger the table deployment in the runtime container 112. Unlike regular applications that are long running processes, the DI deployment app 124 is a task which ends or stops running after the database artifacts are imported into the design-time container 106. In a typical implementation, the DI deployment app 124 can be pushed to the client at any time, without impact on the running database application 128.

A second method to import table description artifacts and data files into the design-time container 106 is through the database application 128. The application 128 can create database artifacts (for example, table description artifacts and data files) and call a DI application programming interface (API) in the DI 104, directly from the application code for importing the database artifacts. For example, in a runtime authoring scenario, the database application 128 can generate new or updated table description artifacts at runtime and call the DI API in the DI 104 to import the newly generated or updated artifacts to the design-time container 106. In some cases, the database application 128 can provide an application UI 134 to the client. The client may update or change content of a table presented to the client using the application UI 134, and the database application 128 can generate or update corresponding table description artifacts based on the client input, and import the artifacts to the database 102. In some implementations, database artifacts can also be loaded to the application 128 from a local file system 136 by, for example, a client request at the application UI 134. In some implementations, database artifacts can be included in an application package of the database application 128 and can be imported to the database 102 at a startup of the application 128, allowing the application 128 to provide additional pre- or post-processing on the database artifacts, which may not be provided by the generic DI deployment app 124.

When exporting table information, the DI 104 can read the table description artifact from the DT artifacts 108 of the design-time container 106 and fetch the actual table content from the application tables 114 of the runtime container 112. The export can be performed through a DI API. The export can be based on the metadata of the table description artifacts stored in the design-time container 106, which can specify content to be exported by using key ranges. The table content is read from the application tables 114, and therefore the exported content might be different from the imported content captured in the design-time container 106 because the content may have been updated by the application 128 during runtime. In runtime authoring scenarios, there can be new table content that was not originally imported but created during the runtime, for example, by the application UI 134 or the application 128. To export the newly-created content, it is possible to generate, for example, by the application 128 at runtime, a table description artifact defining metadata for the export but, without table content. The generated table description artifact can be stored in the DT artifacts 108 and can be deployed using the DI API. After the new content is created and run through application specific validations and consistency checks, the new content can be stored in the application tables 114. When exporting, the DI 104 can read the table description artifact from the DT artifacts 108 of the design-time container 106 and fetch the actual table content from the application tables 114 of the runtime container 112.

As discussed above, the table transport is based on an external VCS 116. The application 128 exports the table description in the DT artifacts 108 and the table content in the application tables 114 to the repository 118 through the VCS client 132. In some implementations, the time when the export happens is under control by the application 128. In some implementations, the application 128 may use the application UI 134 to export table information to the local file system 136. The same or another system can use a corresponding application user interface to import the table information from the local file system 136.

Figure 2:
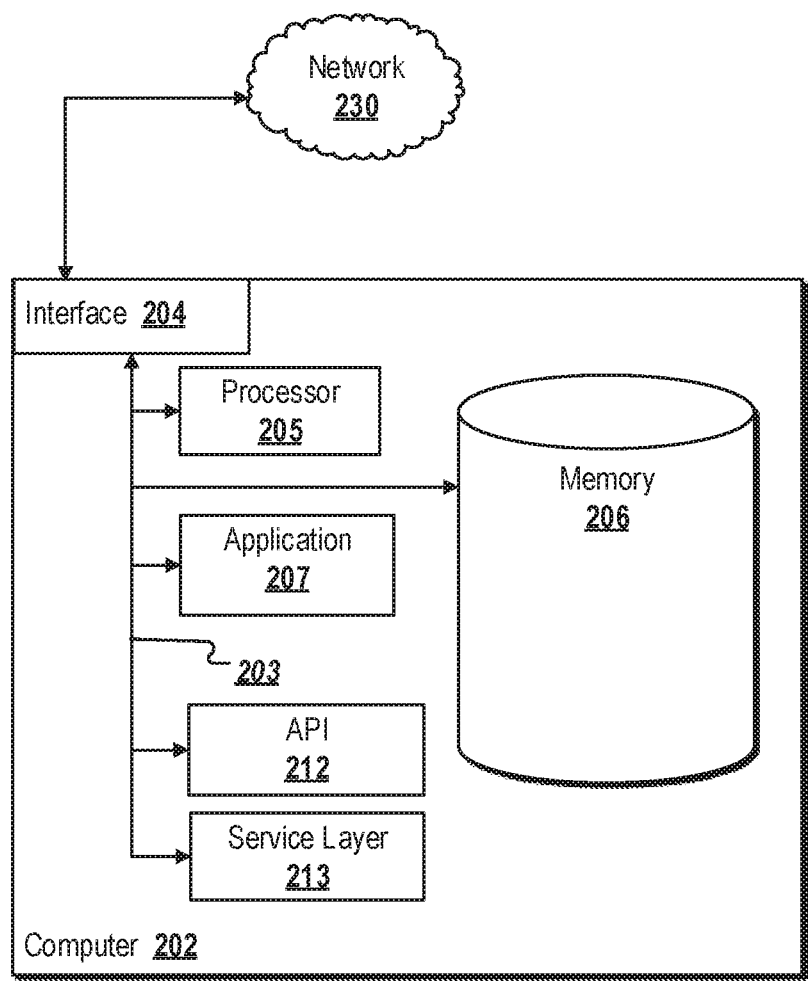
FIG. 2 is a block diagram of an exemplary computer system used to provide computational functionalities associated with described algorithms, methods, functions, processes, flows, and procedures for table content transport and delivery as described in the instant disclosure, according to an implementation.

FIG. 2 is a block diagram of an exemplary computer system 200 used to provide computational functionalities associated with described algorithms, methods, functions, processes, flows, and procedures for table content transport and delivery, as described in the instant disclosure, according to an implementation. The illustrated computer 202 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 202 may comprise a computer that includes an input device, such as a keypad, keyboard, touch screen, or other device that can accept user information, and an output device that conveys information associated with the operation of the computer 202, including digital data, visual, or audio information (or a combination of information), or a GUI.

The computer 202 can serve in a role as a client, network component, a server, a database or other persistency, or any other component (or a combination of roles) of a computer system for performing the subject matter described in the instant disclosure. The illustrated computer 202 is communicably coupled with a network 230. In some implementations, one or more components of the computer 202 may be configured to operate within environments, including cloud-computing-based, local, global, or other environment (or a combination of environments).

At a high level, the computer 202 is an electronic computing device operable to receive, transmit, process, store, or manage data and information associated with the described subject matter. According to some implementations, the computer 202 may also include or be communicably coupled with an application server, e-mail server, web server, caching server, streaming data server, business intelligence (BI) server, or other server (or a combination of servers).

The computer 202 can receive requests over network 230 from a client application (for example, executing on another computer 202) and respond to the received requests by processing the said requests in an appropriate software application. In addition, requests may also be sent to the computer 202 from internal users (for example, from a command console or by other appropriate access method), external or third-parties, other automated applications, as well as any other appropriate entities, individuals, systems, or computers.

Each of the components of the computer 202 can communicate using a system bus 203. In some implementations, any or all of the components of the computer 202, both hardware or software (or a combination of hardware and software), may interface with each other or the interface 204 (or a combination of both) over the system bus 203, using an application programming interface (API) 212 or a service layer 213 (or a combination of the API 212 and service layer 213). The API 212 may include specifications for routines, data structures, and object classes. The API 212 may be either computer-language independent or dependent and refer to a complete interface, a single function, or even a set of APIs. The service layer 213 provides software services to the computer 202 or other components (whether or not illustrated) that are communicably coupled to the computer 202. The functionality of the computer 202 may be accessible for all service consumers using this service layer. Software services, such as those provided by the service layer 213, provide reusable, defined business functionalities through a defined interface. For example, the interface may be software written in JAVA, C++, or other suitable language providing data in extensible markup language (XML) format or other suitable format. While illustrated as an integrated component of the computer 202, alternative implementations may illustrate the API 212 or the service layer 213 as stand-alone components in relation to other components of the computer 202 or other components (whether or not illustrated) that are communicably coupled to the computer 202. Moreover, any or all parts of the API 212 or the service layer 213 may be implemented as child or sub-modules of another software module, enterprise application, or hardware module without departing from the scope of this disclosure.

The computer 202 includes an interface 204. Although illustrated as a single interface 204 in FIG. 2, two or more interfaces 204 may be used according to particular needs, desires, or particular implementations of the computer 202. The interface 204 is used by the computer 202 for communicating with other systems in a distributed environment, that are connected to the network 230 (whether illustrated or not). Generally, the interface 204 comprises logic encoded in software or hardware (or a combination of software and hardware) and operable to communicate with the network 230. More specifically, the interface 204 may comprise software supporting one or more communication protocols associated with communications such that the network 230 or interface's hardware is operable to communicate physical signals within and outside of the illustrated computer 202.

The computer 202 includes a processor 205. Although illustrated as a single processor 205 in FIG. 2, two or more processors may be used according to particular needs, desires, or particular implementations of the computer 202. Generally, the processor 205 executes instructions and manipulates data to perform the operations of the computer 202 and any algorithms, methods, functions, processes, flows, and procedures as described in the instant disclosure.

The computer 202 also includes a memory 206 that holds data for the computer 202 or other components (or a combination of both) that can be connected to the network 230 (whether illustrated or not). For example, memory 206 can be a database storing data consistent with this disclosure. Although illustrated as a single memory 206 in FIG. 2, two or more memories may be used according to particular needs, desires, or particular implementations of the computer 202 and the described functionality. While memory 206 is illustrated as an integral component of the computer 202, in alternative implementations, memory 206 can be external to the computer 202.

The application 207 is an algorithmic software engine providing functionality according to particular needs, desires, or particular implementations of the computer 202, particularly with respect to functionality described in this disclosure. For example, application 207 can serve as one or more components, modules, applications, etc. Further, although illustrated as a single application 207, the application 207 may be implemented as multiple applications 207 on the computer 202. In addition, although illustrated as integral to the computer 202, in alternative implementations, the application 207 can be external to the computer 202.

There may be any number of computers 202 associated with, or external to, a computer system containing computer 202, each computer 202 communicating over network 230. Further, the term "client," "user," and other appropriate terminology may be used interchangeably, as appropriate, without departing from the scope of this disclosure. Moreover, this disclosure contemplates that many users may use one computer 202, or that one user may use multiple computers 202.

Figure 3:
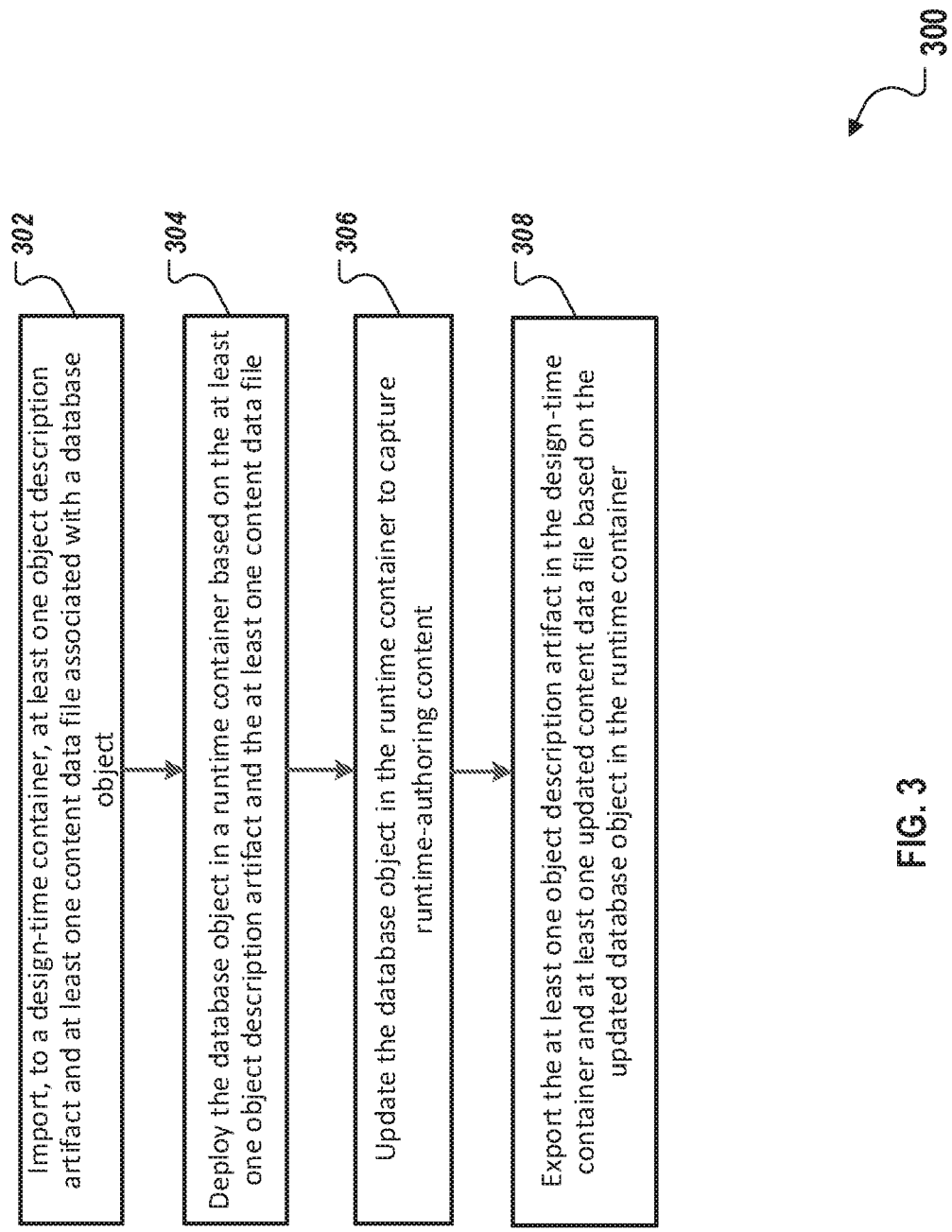
FIG. 3 is a flowchart of an example method for table content transport and delivery, according to an implementation.

FIG. 3 is a flowchart of an example method 300 for table content transport and delivery, according to an implementation. For clarity of presentation, the description that follows generally describes method 300 in the context of the other figures in this description. However, it will be understood that method 300 may be performed, for example, by any suitable system, environment, software, and hardware, or a combination of systems, environments, software, and hardware as appropriate. In some implementations, various steps of method 300 can be run in parallel, in combination, in loops, or in any order.

At 302, a DI of a database imports at least one object description artifact and at least one content data file associated with a database object to a design-time container. The database object can be a table and the object description artifact can be a table description artifact. As will be understood by those of ordinary skill in the art, the database object can be a database object other than a table, for example, a view. The DI deployment app can be used to upload the object description artifacts and content data files from the VCS to the database. In some implementations, a database application can call the DI directly to create an object description artifact at runtime to be imported to the design-time container. The From 302, method 300 proceeds to 304.

At 304, the DI deploys the database object in a runtime container based on the imported at least one object description artifact and the at least one content data file. For example, the DI can deploy a table in the runtime container based on the table description artifacts and content data files stored in the design-time container. From 304, method 300 proceeds to 306.

At 306, the runtime container captures runtime-authoring content. For example, Table content newly-generated or updated during the runtime of the database application can be stored in the runtime container. In some implementations, the table deployed at 304 in the runtime container can be updated based on the table content generated at the runtime. From 306, method 300 proceeds to 308.

At 308, the DI exports the at least one object description artifact in the design-time container and at least one updated content data file based on the updated database object in the runtime container to the VCS. The table in the runtime container captures the updated table content at runtime of the database application. In some implementation, the DI can read content from the table in the runtime container and generate exported data files. The DI may export the table content to multiple data files. For example, if a table captures both default and customer configuration data, the DI may extract the content data and store default configuration and customer configuration in separate content data files. From 308, method 300 stops.

In the following, the described approach is applied to two scenarios to illustrate table content transport and delivery.

The first scenario uses tables to transport configuration data. In some implementations, there may be default configuration data that needs to be delivered from an application provider to customers and the configuration changes performed by customers in development or test systems need to be transported to corresponding production systems. For example, in a business application, the default payment type set by the application provider may be "credit card" while the customer may change to "cash". Default configuration can be delivered by a table description artifact with table content that is typically created at design time in the configuration user interface of the application. Alternatively, the table content can also be created using tools such as Excel to create a content file in CSV format.

A typical requirement for configuration data is the need to overlay multiple values for a same key to enable customers to override the default values delivered by the application provider while still keep the default values in the system. The overlay not only serves as a fallback to default values but also provides a mechanism to detect changes in the standard application delivery so that the customers can decide whether to stay with their custom values or adopt the newly delivered default values.

The overlay can be achieved in multiple approaches. A first approach is to store default configuration and customer configuration in separate tables. This approach provides a clear separation between the application provider content and customer content that allows updating each of them by a complete replacement of the respective table. Access to overlaid values can be achieved by a view over these tables with a calculated field that contains the customer value if it is set, otherwise the default value.

A second approach, which is more flexible than the first approach, is to store both default and customer configuration data in a same table, separated by a namespace as key field. While this separation is not as strong as storing the default and customer data in individual tables, it has several benefits and can be easily reflected with key ranges in the table description artifacts. The most important benefit is that it is possible to have multiple layers of overlaying without a need to create additional tables. For example, a namespace column can be used to indicate an overlay level index. The overlay value may be simply increased by one for every new layer added. Each layer in the configuration table, identified by its specific namespace, can then be transported in a separate table description artifact that lists the respective namespace value as key range. For example, the default configuration can have an overlay index of 0 and the customer configuration can have an overlay index of 1. The default configuration can be described by a table description artifact specifying key range of 0 for the namespace column, while the customer configuration can be described by another table description artifact with key range of 1 for the namespace column. In some implementations, this enables re-deployment of updated default configuration without affecting other layers as only the entries in the table that match the specified key range are replaced with new content. For example, key range of the namespace column can be specified to be 0 when updating the default configuration. Further, content identified by its specific namespace can be exported separately from other table content for transport to another system. For example, a table description artifact specifying key range of 1 for the namespace column can be used to export the customer configuration.

The second scenario uses tables to transport translatable text. FIGS. 4A-4C, 5, and 6A-6B illustrate content data files and table description artifacts associated with a translatable text table. In some implementations, translatable text tables can be used to enable an identical translation process for user interfaces or applications, in different languages. The translatable text tables can be stored in the application tables of the runtime container and joined to other tables that have multiple key fields. When the data files for table content are in a properties file format, in order to deploy text from properties files to tables with multiple key fields, multiple table keys can be concatenated and separated by periods in the corresponding properties files. For example, as will be discussed in FIGS. 4A-4C and 5, for a text table with two key fields where each row of the text table storing text for table keys a and b, each row can be represented as a.b=text in a properties file (concatenating table keys a and b). During deployment, the DI can split and extract the table keys from the properties file to insert in the text table. Accordingly, when the DI exports table content to a properties file, it concatenates the table keys to insert in the properties file. A consequence of such handling is that table keys used in properties files cannot contain a period (.), as this is used as the separator.

FIGS. 4A-4C illustrate content data files for a translatable text table in a properties file format where the text table captures text corresponding to a left button and a right button of a widget in different languages. FIG. 4A illustrates a properties file 400a of a translatable text table for default configuration and English language, according to an implementation. Line 402 indicates that text for the left button of the widget is "Left Button" which is represented as button.left="Left Button", while line 404 indicates that text for the right button of the widget is "Right Button" which is represented as buttonsight="Right Button". Similarly, FIG. 4B illustrates a properties file 400b of a translatable text table for default configuration and German language, according to an implementation. The properties file 400b includes the default configured text for the left and right button in German. FIG. 4C illustrates a properties file 400c of a translatable text table for customer configuration and English language, according to an implementation. The properties file 400c includes the customer configured text for the left and right button in English. The file names for properties files 400a, 400b, and 400c are widgets_default_en.properties, widgets_default_de.properties, and widgets_customer_en.properties, respectively.

Figure 5:
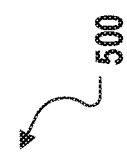
FIG. 5 illustrate a translatable text table, according to an implementation.

FIG. 5 illustrate a translatable text table 500, according to an implementation. The content data files in FIGS. 4A-4C are associated with the text table is FIG. 5. In some implementations, the translatable text table may need additional key fields to indicate static information of properties files. For example, although properties file 400a includes text for default configuration and English language, the data itself in the properties file 400a does not indicate such information. To indicate such static information of the properties file, constant fields can be defined in the text table. For example, a language column can be defined to indicate the language and a namespace column can be used to indicate default configuration or customer configuration. In FIG. 5, the text table 500 has five columns, Key1 column 502, Key2 column 504, Namespace column 506, Language column 508, and Text column 510. As discussed, the Namespace column 506 and the Language column 508 are used to indicate the static information of properties files. The Namespace column 506 indicates default configuration with a key range 0 and customer configuration with a key range 1. The Language column 508 indicates English language with a key range en and German language with a key range de. The text table 500 has six rows, rows 514 and 516 indicating translatable text for default configuration and English language, rows 518 and 520 for default configuration and German language, and rows 522 and 524 for customer configuration and English language. The name of the table 500 is Widgets.

FIGS. 6A and 6B illustrate table description artifacts associated with the text table in FIG. 5. The table description artifacts in FIGS. 6A and 6B together with the properties files in FIGS. 4A-4C form the text table in FIG. 5. In other words, the text table in FIG. 5 is described by two table description artifacts and imports data from three properties files. FIG. 6A illustrates a table description artifact 600a for default configuration, according to an implementation. Line 602 and line 612 indicate that the table description artifact 600a references two properties files, that is, the properties files widgets_default_en.properties and widgets_default_de.properties in FIGS. 4A and 4B. Line 606 and 616 specify how the DI would map data in the properties files 400a and 400b to the text table 500. For example, line 606 specifies that the first element button, second element left, and third element Left Button in button.left="Left Button" at line 402 of the properties file 400a are to be mapped to Key1 column 502, Key2 column 504, and Text column 510 in the table, respectively. Line 604 and line 614 indicate key ranges for constant fields such as the Namespace column 506 and the Language column 508. For example, when importing widgets_default_en.properties to the text table 500, besides mapping data in the properties file 400a to Key1 column 502, Key2 column 504, and Text column 510, line 604 sets the Namespace column 506 to 0 to indicate default configuration and the Language column 508 to en to indicate English language. Similarly, when importing widgets_default_de.properties, line 614 sets the Namespace column 506 to 0 to indicate default configuration and the Language column 508 to de to indicate German language. Line 608 and line 618 specify that the name of the target text table is Widgets. Similarly, FIG. 6B illustrates a table description artifact 600b for customer configuration, according to an implementation. Line 622 indicates that the table description artifact 600b references the properties file widgets_customer_en.properties in FIG. 4C. When importing widgets_customer_en.properties file to the text table 500, besides mapping data in the properties file 400c to Key1 column 502, Key2 column 504, and Text column 510, line 624 sets the Namespace column 506 to 1 to indicate customer configuration and the Language column 508 to en to indicate English language. Line 628 specifies that the name of the target text table is Widgets. Since the table description artifacts 600a and 600b refer to the same target table at lines 608, 618, and 628, both artifacts will be used when deploying the target table 500 Widgets. The DI may also use table description artifacts for exporting table content. For example, the DI may use the table description artifact 600b to extract customer configuration from the table 500 and export to a properties file. For example, based on the constant columns specified at line 624, the DI may collect data from the table 500 corresponding to a key range of 1 for the Namespace column 506 and a key range of en for the Language column 508, that is, data in rows 522 and 524 in the table 500. The DI may remove the data of the constant columns and store the remaining data in rows 522 and 524 to a properties file.

Described implementations of the subject matter can include one or more features, alone or in combination.

For example, in a first implementation, a computer-implemented method includes importing, to a design-time container, at least one object description artifact and at least one content data file associated with a database object; deploying, by a DI, the database object in a runtime container based on the at least one object description artifact and the at least one content data file; and exporting the at least one object description artifact in the design-time container and at least one updated content data file based on an updated database object in the runtime container, wherein the updated database object includes updated content of the database object generated at runtime of a database application.

The foregoing and other described implementations can each optionally include one or more of the following features:

A first feature, combinable with any of the following features, wherein the database object is a table, the at least one object description artifact is at least one table description artifact, the at least one table description artifact includes metadata describing a structure of the table, and the at least one content data file includes content data of the table.

A second feature, combinable with any of the previous or following features, wherein the at least one object description artifact includes a file name of the at least one content data file.

A third feature, combinable with any of the previous or following features, wherein the at least one object description artifact is created by the database application.

A fourth feature, combinable with any of the previous or following features, wherein the at least one object description artifact is imported by using a DI deployment app.

A fifth feature, combinable with any of the previous or following features, further comprising importing the at least one object description artifact and the at least one content data file from a version control system; and exporting the at least one object description artifact and the at least one updated content data file to the version control system.

A sixth feature, combinable with any of the previous or following features, wherein the at least one content data file is in at least one of a comma-separated values (CVS) file format or a properties file format.

In a second implementation, a non-transitory computer-readable medium includes a non-transitory, computer-readable medium storing one or more instructions executable by a computer system to perform operations comprising: importing, to a design-time container, at least one object description artifact and at least one content data file associated with a database object; deploying, by a deployment infrastructure (DI), the database object in a runtime container based on the at least one object description artifact and the at least one content data file; and exporting the at least one object description artifact in the design-time container and at least one updated content data file based on an updated database object in the runtime container, wherein the updated database object includes updated content of the database object generated at runtime of a database application.

The foregoing and other described implementations can each optionally include one or more of the following features:

A first feature, combinable with any of the following features, wherein the database object is a table, the at least one object description artifact is at least one table description artifact, the at least one table description artifact includes metadata describing a structure of the table, and the at least one content data file includes content data of the table.

A second feature, combinable with any of the previous or following features, wherein the at least one object description artifact includes a file name of the at least one content data file.

A third feature, combinable with any of the previous or following features, wherein the at least one object description artifact is created by the database application.

A fourth feature, combinable with any of the previous or following features, wherein the at least one object description artifact is imported by using a DI deployment app.

A fifth feature, combinable with any of the previous or following features, wherein the operations further comprise: importing the at least one object description artifact and the at least one content data file from a version control system; and exporting the at least one object description artifact and the at least one updated content data file to the version control system.

A sixth feature, combinable with any of the previous or following features, wherein the at least one content data file is in at least one of a comma-separated values (CVS) file format or a properties file format.

In a third implementation, a computer-implemented system includes a computer system, comprising: a computer memory; and a hardware processor interoperably coupled with the computer memory and configured to perform operations comprising: importing, to a design-time container, at least one object description artifact and at least one content data file associated with a database object; deploying, by a deployment infrastructure (DI), the database object in a runtime container based on the at least one object description artifact and the at least one content data file; and exporting the at least one object description artifact in the design-time container and at least one updated content data file based on an updated database object in the runtime container, wherein the updated database object includes updated content of the database object generated at runtime of a database application.

The foregoing and other described implementations can each optionally include one or more of the following features:

A first feature, combinable with any of the following features, wherein the database object is a table, the at least one object description artifact is at least one table description artifact, the at least one table description artifact includes metadata describing a structure of the table, and the at least one content data file includes content data of the table.

A second feature, combinable with any of the previous or following features, wherein the at least one object description artifact includes a file name of the at least one content data file.

A third feature, combinable with any of the previous or following features, wherein the at least one object description artifact is created by the database application.

A fourth feature, combinable with any of the previous or following features, wherein the at least one object description artifact is imported by using a DI deployment app.

A fifth feature, combinable with any of the previous or following features, wherein the operations further comprise: importing the at least one object description artifact and the at least one content data file from a version control system; and exporting the at least one object description artifact and the at least one updated content data file to the version control system.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers, executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural, to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an API or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims, as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    importing, to a design-time container, at least one object description artifact and at least one content data file associated with a database object, wherein the at least one object description artifact describes a target state of an object and dependencies on other database objects for determination of a valid order of deployment and, wherein the database object is a table, the at least one object description artifact is at least one table description artifact, the at least one table description artifact includes metadata describing a structure of the table, and the at least one content data file includes content data of the table;
    deploying, by a deployment infrastructure (DI), the database object in a runtime container based on the at least one object description artifact and the at least one content data file; and
    exporting the at least one object description artifact in the design-time container and at least one updated content data file based on an updated database object in the runtime container, wherein the updated database object includes updated content of the database object generated at runtime of a database application.

2. The computer-implemented method of claim 1, wherein the at least one object description artifact includes a file name of the at least one content data file.

3. The computer-implemented method of claim 1, wherein the at least one object description artifact is created by the database application.

4. The computer-implemented method of claim 1, wherein the at least one object description artifact is imported by using a DI deployment app.

5. The computer-implemented method of claim 1, further comprising:
    importing the at least one object description artifact and the at least one content data file from a version control system; and
    exporting the at least one object description artifact and the at least one updated content data file to the version control system.

6. The computer-implemented method of claim 1, wherein the at least one content data file is in at least one of a comma-separated values (CVS) file format or a properties file format.

7. A non-transitory, computer-readable medium storing one or more instructions executable by a computer system to perform operations comprising:
    importing, to a design-time container, at least one object description artifact and at least one content data file associated with a database object, wherein the at least one object description artifact describes a target state of an object and dependencies on other database objects for determination of a valid order of deployment and, wherein the database object is a table, the at least one object description artifact is at least one table description artifact, the at least one table description artifact includes metadata describing a structure of the table, and the at least one content data file includes content data of the table;

deploying, by a deployment infrastructure (DI), the database object in a runtime container based on the at least one object description artifact and the at least one content data file; and exporting the at least one object description artifact in the design-time container and at least one updated content data file based on an updated database object in the runtime container, wherein the updated database object includes updated content of the database object generated at runtime of a database application.

8. The non-transitory, computer-readable medium of claim 7, wherein the at least one object description artifact includes a file name of the at least one content data file.

9. The non-transitory, computer-readable medium of claim 7, wherein the at least one object description artifact is created by the database application.

10. The non-transitory, computer-readable medium of claim 7, wherein the at least one object description artifact is imported by using a DI deployment app.

11. The non-transitory, computer-readable medium of claim 7, wherein the operations further comprise:
    importing the at least one object description artifact and the at least one content data file from a version control system; and
    exporting the at least one object description artifact and the at least one updated content data file to the version control system.

12. The non-transitory, computer-readable medium of claim 7, wherein the at least one content data file is in at least one of a comma-separated values (CVS) file format or a properties file format.

13. A computer system, comprising:
    a computer memory; and
    a hardware processor interoperably coupled with the computer memory and configured to perform operations comprising:
        importing, to a design-time container, at least one object description artifact and at least one content data file associated with a database object, wherein the at least one object description artifact describes a target state of an object and dependencies on other database objects for determination of a valid order of deployment and, wherein the database object is a table, the at least one object description artifact is at least one table description artifact, the at least one table description artifact includes metadata describing a structure of the table, and the at least one content data file includes content data of the table;
        deploying, by a deployment infrastructure (DI), the database object in a runtime container based on the at least one object description artifact and the at least one content data file; and
        exporting the at least one object description artifact in the design-time container and at least one updated content data file based on an updated database object in the runtime container, wherein the updated database object includes updated content of the database object generated at runtime of a database application.

14. The computer system of claim 13, wherein the at least one object description artifact includes a file name of the at least one content data file.

15. The computer system of claim 13, wherein the at least one object description artifact is created by the database application.

16. The computer system of claim 13, wherein the at least one object description artifact is imported by using a DI deployment app.

17. The computer system of claim 13, wherein the operations further comprise:
    importing the at least one object description artifact and the at least one content data file from a version control system; and
    exporting the at least one object description artifact and the at least one updated content data file to the version control system.

* * * * *